(12) United States Patent
Alamdari et al.

(10) Patent No.: US 11,535,792 B2
(45) Date of Patent: Dec. 27, 2022

(54) CROSSLINKED POLYMERS FOR USE IN CRUDE OIL RECOVERY

(71) Applicant: ChampionX USA Inc., Sugar Land, TX (US)

(72) Inventors: Baharak Barzegar Alamdari, Sugar Land, TX (US); Mehdi Salehi, Aurora, CO (US); Mahdi Kazempour, Sugar Land, TX (US)

(73) Assignee: ChampionX USA Inc., Sugar Land, TX (US)

( * ) Notice: Subject to any disclaimer, the term of this patent is extended or adjusted under 35 U.S.C. 154(b) by 330 days.

(21) Appl. No.: 16/656,025

(22) Filed: Oct. 17, 2019

(65) Prior Publication Data
US 2020/0123434 A1  Apr. 23, 2020

Related U.S. Application Data
(60) Provisional application No. 62/746,961, filed on Oct. 17, 2018.

(51) Int. Cl.
*C09K 8/588* (2006.01)

(52) U.S. Cl.
CPC .................. *C09K 8/588* (2013.01)

(58) Field of Classification Search
None
See application file for complete search history.

(56) References Cited

U.S. PATENT DOCUMENTS

| | | | | |
|---|---|---|---|---|
| 3,039,529 A | * | 6/1962 | McKennon | C09K 8/588 166/275 |
| 3,396,790 A | * | 8/1968 | Eaton | C09K 8/601 166/293 |
| 3,741,307 A | * | 6/1973 | Sandiford | E21B 43/16 166/400 |
| 3,762,476 A | | 10/1973 | Ball | |
| 3,981,363 A | | 9/1976 | Gall | |

(Continued)

FOREIGN PATENT DOCUMENTS

| | | |
|---|---|---|
| GB | 2 255 360 A | 11/1992 |
| WO | 2016/084032 A1 | 6/2016 |

(Continued)

OTHER PUBLICATIONS

International Search Report and Written Opinion dated Dec. 18, 2019 relating to PCT Application No. PCT/US2019/056629, 13 pages.

(Continued)

*Primary Examiner* — John J Figueroa
(74) *Attorney, Agent, or Firm* — Stinson LLP

(57) ABSTRACT

Mobility control polymers can be used to increase recovery of crude oil from a subterranean hydrocarbon-containing formation. A flooding fluid comprising the polymer are injected into a well that is in contact with the subterranean hydrocarbon-containing formation. The polymers are derived from reacting a crosslinking agent with a polymer and the crosslinking agent comprises a polyvalent metal ion having a weight/weight ratio of polymer to crosslinking agent of at least 60:1. These flooding fluids have improved injectivity into the well; the improved injectivity can be measured in terms of the flooding fluid's filter ratio, flow rate, and viscosity.

20 Claims, 3 Drawing Sheets

(56) References Cited

U.S. PATENT DOCUMENTS

| | | | | |
|---|---|---|---|---|
| 4,332,297 | A | * | 6/1982 | Sandiford .............. C09K 8/588 |
| | | | | 166/246 |
| 4,917,186 | A | | 4/1990 | Mumallah |
| 5,076,362 | A | | 12/1991 | Beardmore |
| 5,145,012 | A | * | 9/1992 | Hutchins .................. C09K 8/50 |
| | | | | 166/295 |
| 5,186,257 | A | | 2/1993 | Stahl et al. |
| 5,547,025 | A | | 8/1996 | Ahmed et al. |
| 5,559,263 | A | | 9/1996 | Smith |
| 5,654,261 | A | | 8/1997 | Smith |
| 5,662,168 | A | | 9/1997 | Smith |
| 2011/0312858 | A1 | | 12/2011 | Holt |
| 2011/0315383 | A1 | | 12/2011 | Li et al. |
| 2011/0315384 | A1 | | 12/2011 | Miquilena et al. |
| 2012/0305247 | A1 | | 12/2012 | Chen et al. |
| 2015/0101810 | A1 | | 4/2015 | Aines et al. |
| 2015/0159079 | A1 | | 6/2015 | Huh et al. |
| 2016/0032170 | A1 | * | 2/2016 | Li .......................... C09K 8/584 |
| | | | | 166/305.1 |
| 2016/0177662 | A1 | | 6/2016 | Bennetzen et al. |
| 2016/0186045 | A1 | | 6/2016 | Maguire-Boyle et al. |
| 2016/0257878 | A1 | | 9/2016 | Hu et al. |
| 2016/0376389 | A1 | | 12/2016 | Marrou et al. |
| 2016/0376390 | A1 | | 12/2016 | Marrou et al. |
| 2017/0096597 | A1 | | 4/2017 | Hu et al. |
| 2017/0145292 | A1 | * | 5/2017 | Szalai ..................... C09K 8/512 |

FOREIGN PATENT DOCUMENTS

| | | |
|---|---|---|
| WO | 2017/034547 A1 | 3/2017 |
| WO | 2017/048230 A1 | 3/2017 |
| WO | 2017/147277 A1 | 8/2017 |

OTHER PUBLICATIONS

Al-Assi A.A. et al., Formation and Propagation of Gel Aggregates Using Partially Hydrolyzed Polyacrylamide and Aluminum Citrate, Society of Petroleum Engineers (2009), pp. 450-461.

Bjorsvik, Magny et al., Formation of colloidal dispersion gels from aqueous polyacrylamide solutions, Colloids and Surfaces A: Physicochem. Eng. Aspects 317 (2008), pp. 504-511.

Cai, Wensheng et al., Study on gelation of partially hydrolyzed polyacrylamide with titanium (IV), European Polymer Journal 37 (2001) pp. 1553-1559.

Castro, R. et al., Colloidal Dispersion Gels (CDG) in Dina Cretaceos Field: From Pilot Design to Field Implementation and Performance, Society of Petroleum Engineers (2013), 12 pages.

Chauveteau, G. et al., Controlling Gelation Time and Microgel Size for Water Shutoff, Society of Petroleum Engineers (2000), 8 pages.

Chauveteau, G. et al., New Size-Controlled Microgels for Oil Production, Society of Petroleum Engineers (2001), 8 pages.

Diaz, D. et al., Colloidal Dispersion Gels Improve Oil Recovery in a Heterogeneous Argentina Waterflood, Society of Petroleum Engineers (2008), 10 pages.

Dong, Han et al., Flow Mechanism Investigation and Field Practice for Low Concentration Flowing Gel, Society of Petroleum Engineers (1998), pp. 483-500.

Ghazali, H.A.. et al., Permeability Modification Using Aluminum Citrate/Polymer Treatments: Mechanisms of Permeability Reduction in Sandpacks, Society of Petroleum Engineers (1985), 11 pages.

Han, Ming et al., State-of-the-Art of In-Depth Fluid Diversion Technology: Enhancing Reservoir Oil Recovery by Gel Treatments, Society of Petroleum Engineers (2014), 10 pages.

Kedir, Abduljelil Sultan, et al., Nanoparticles for Enhanced Oil Recovery: Influence of pH on Aluminum-Cross-linked Partially Hydrolyzed Polyacrylamide-Investigation by Rheology and NMR, Energy Fuels 28 (2014), pp. 2343-2351.

Kedir, Abduljelil Sultan, et al., Nanoparticles for Enhanced Oil Recovery: Phase Transition of Aluminum-Cross-Linked Partially Hydrolyzed Polyacrylamide under Low-Salinity Conditions by Rheology and Nuclear Magnetic Resonance, Energy Fuels 28 (2014) pp. 2948-2958.

Li, Ming-Yuan et al., A study on the size and conformation of linked polymer coils, Journal of Petroleum Science and Engineering 41 (2004), pp. 213-219.

Mack J.C. et al., In-Depth Colloidal Disper539ion Gels Improve Oil Recovery Efficiency, Society of Petroleum Engineers (1994), pp. 527-539.

Manrique, E. et al., Collodial Dispersion Gels (CDG): Field Projects Review, Society of Petroleum Engineers (2014), 13 pages.

Moffitt, P.D. et al., Application of Freshwater and Brine Polymer Flooding in the North Burbank Unit, Osage County, Oklahoma, Society of Petroleum Engineers, Reservoir Engineering (1993), pp. 128-134.

Moffitt, P.D. et al., Development and Field Testing of a New Low Toxicity Polymer Crosslinking System, Society of Petroleum Engineers (1996), pp. 283-289.

Muruaga E. et al., Combining Bulk Gels and Colloidal Dispersion Gels for Improved Volumetric Sweep Efficiency in a Mature Waterflood, Society of Petroleum Engineers (2008), 12 pages.

Needham, R.B. et al., Control of Water Mobility Using Polymers and Multivalent Cations, American Institute of Mining, Metallurgical, and Petroleum Engineers, Inc. (1974), 10 pages.

Parmeswar, Ravi et al., A Study of the Reduction of Brine Permeability in Berea Sandstone With the Aluminum Citrate Process, SPE Reservoir Engineering (1988), pp. 959-966.

Ranganathan, Raja et al., Experimental Study of the Gelation Behavior of a Polyacrylamide/Aluminum Citrate Colloidal-Dispersion Gel System, Society of Petroleum Engineers (1998), pp. 337-343.

Rocha, C.A. et al., An Experimental Study of the Interactions of Aluminum Citrate Solutions and Silica Sand, Society of Petroleum Engineers (1989), pp. 403-414.

Randy, Seright et al., Current Colloidal Dispersion Gels Are Not Superior to Polymer Flooding, Exploration and Development Research Institute of Daqing Oil Field Company Ltd. (2006) pp. 71-80.

Shiran, Behruz Shaker et al., Similarities and Differences of Low Salinity Polymer and Low Salinity LPS (Linked Polymer Solutions) for Enhanced Oil Recovery, Journal of Dispersion Science and Technology, 35 (2014) pp. 1656-1664.

Skauge, Tormod et al., Nanosized Particles for Enhanced Oil Recovery, EOR Performance and Modeling (Jan. 2011), p. 54 and 56.

Smith J.E., Closing the Lab-Field Gap: A Look at Near-Wellbore Flow Regimes and Performance of 57 Field Projects, Society of Petroleum Engineers (1994), pp. 445-459.

Smith, J.E. et al., Laboratory Studies of In-Depth Colloidal Dispersion Gel Technology for Daqing Oil Field, Society of Petroleum Engineers (2000), 13 pages.

Smith, J.E., Performance of 18 Polymers in Aluminum Citrate Colloidal Dispersion Gels, Society of Petroleum Engineers (1995), pp. 461-470.

Smith, J.E., The Transition Pressure: A Quick Method for Quantifying Polyacrylamide Gel Strength, Society of Petroleum Engineers (1989), pp. 473-480.

Spildo, K. et al., A New Polymer Application for North Sea Reservoirs, Society of Petroleum Engineers (2009), 8 pages.

Spildo, K. et al., Propagation of Colloidal Dispersion Gels (CDG) in Laboratory Corefloods, Society of Petroleum Engineers (2010), 7 pages.

Walsh, M.P. et al., Chemical Interactions of Aluminum-Citrate Solutions with Formation Minerals, Society of Petroleum Engineers (1983), 14 pages.

Wang, W. et al., Applications of Weak Gel for In-Depth Profile Modification and Oil Displacement, Journal of Canadian Petroleum Technology, vol. 42, No. 6 (Jun. 2003), pp. 54-61.

Wang, D. et al., Sweep Improvement Options for the Daqing Oil Field, Society of Petroleum Engineers (2006), 13 pages.

Zhidong, Guo et al., The Study of Oil Displacement Characteristics of CDG and Polymer Flooding, Society of Petroleum Engineers (2011), 14 pages.

(56) References Cited

OTHER PUBLICATIONS

Zou, Bin et al., Precipitation of Chromium Acetate Solutions, SPE Journal, vol. 5, No. 3 (Sep. 2000), pp. 324-330.

* cited by examiner

CROSSLINKED POLYMERS FOR USE IN CRUDE OIL RECOVERY

CROSS REFERENCE TO RELATED APPLICATIONS

This application claims priority to U.S. Provisional Patent Application Ser. No. 62/746,961 filed on Oct. 17, 2018, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

The present invention generally relates to improved crosslinked polymers for use as mobility control agents that can be used to increase recovery of crude oil from a subterranean hydrocarbon-containing formation.

BACKGROUND OF THE INVENTION

In the recovery of oil from oil-bearing reservoirs, it is typically possible to recover only minor portions of the original oil in place by primary recovery methods which utilize only the natural forces present in the reservoir. Thus, a variety of supplemental techniques have been developed and used to increase oil recovery. A commonly used secondary technique is waterflooding, which involves injection of water into the oil reservoir. As the water moves through the reservoir, it displaces the oil to one or more production wells where the oil is recovered.

One problem encountered with waterflooding operations is the relatively poor sweep efficiency of the water, i.e., the water can channel through certain portions of the reservoir as it travels from the injection well(s) to the production well(s), thereby bypassing other portions of the reservoir. Poor sweep efficiency can be due, for example, to differences in the mobility of the water versus that of the oil, and permeability variations within the reservoir, which encourage flow through some portions of the reservoir and not others.

Various enhanced oil recovery techniques have been used to improve sweep efficiency. Aqueous solutions containing high molecular weight, water-soluble polymers have been employed to improve sweep efficiency. These media are more viscous than ordinary water or brine, but often undergo molecular weight breakdown, degradation due to temperature, high shear, oxidative stress, and physical force of the wellbore. The degradation leads to reduced viscosity and reduced secondary and tertiary recovery rates of oil from subterranean formations. Flooding fluids having improved characteristics including an advantageous injection rate and higher production rates are needed.

SUMMARY OF THE INVENTION

Methods for increasing recovery of crude oil from a subterranean hydrocarbon containing formation are disclosed. The method comprises injecting an aqueous flooding fluid into a well that is in contact with the subterranean hydrocarbon-containing formation, the aqueous flooding fluid comprising injection water and a mobility control agent. The mobility control agent comprises a crosslinked water-soluble polymer wherein the crosslinked water-soluble polymer is derived from reacting a crosslinking agent with a polymer and the crosslinking agent comprises a polyvalent metal ion having a weight/weight ratio of polymer to crosslinking agent of at least 60:1.

For the methods described herein, the weight/weight ratio of polymer to crosslinking agent is from about 60:1 to about 200:1; from about 60:1 to about 160:1; from about 70:1 to about 160:1; or from about 70:1 to about 120:1.

Also, the methods of increasing recovery of crude oil can have the weight/weight ratio of polymer to crosslinking agent be from about 90:1 to about 200:1 when the aqueous flooding fluid comprises at least 0.5 weight percent KCl.

The methods can have the pressure differential of the flooding fluid containing the crosslinked water-soluble polymer be not greater than the pressure differential of a flooding fluid containing an otherwise identical water-soluble polymer that is not crosslinked with a polyvalent metal ion.

Further, the methods can have the water-soluble polymer comprise a repeat unit derived from acrylic acid, an acrylic acid salt, a methacrylic acid salt, methacrylic acid, diacetone acrylamide, acrylamide, methacrylamide, a 2-acrylamido-2-methylpropane sulfonate, an acrylamido-t-butyl sulfonate, styrene sulfonate, 2-(acryloyloxy)-N,N,N-trimethylethanaminium, N,N-dimethylaminoethyl acrylate methyl chloride, N,N-dimethylaminoethyl methacrylate methyl chloride quaternary salt, N,N-dimethylaminopropyl acrylamide methyl chloride, N,N-dimethylaminopropyl methacrylamide methyl chloride, N-vinylformamide, N-vinylpyrrolidinone, diallyldimethyl ammonium chloride, carboxymethylcellulose, vinyl alcohol, or a combination thereof; preferably, the water-soluble polymer can comprise a repeat unit derived from acrylic acid, an acrylic acid salt, a methacrylic acid salt, methacrylic acid, acrylamide, a 2-acrylamido-2-methylpropane sulfonate, or a combination thereof; more preferably, the water-soluble polymer can comprise a repeat unit derived from acrylic acid, an acrylic acid salt, acrylamide, or a combination thereof.

The methods of increasing recovery of crude oil can have the water-soluble polymer comprise hydrolyzed polyacrylamide.

When the water-soluble polymer comprises hydrolyzed polyacrylamide, the hydrolyzed polyacrylamide can be from about 20 percent hydrolyzed to about 40 percent hydrolyzed; or from about 30 percent hydrolyzed to about 35 percent hydrolyzed.

The methods can have the polyvalent metal ion be a calcium ion, a zinc(II) ion, a chromium(II) ion, a chromium(III) ion, an aluminum ion, or a combination thereof.

Additionally, the methods described herein can have the crosslinking agent be calcium acetate, calcium lactate, calcium oxalate, calcium maleate, calcium succinate, calcium glutarate, calcium citrate, calcium phosphonate, calcium sulfonate, calcium carbonate, calcium chloride, calcium bromide, zinc(II) acetate, zinc(II) lactate, zinc(II) oxalate, zinc(II) maleate, zinc(II) succinate, zinc(II) glutarate, zinc (II) citrate, zinc(II) phosphonate, zinc(II) sulfonate, zinc(II) carbonate, zinc(II) chloride, zinc(II) bromide, chromium(II) acetate, chromium(II) lactate, chromium(II) oxalate, chromium(II) maleate, chromium(II) succinate, chromium(II) glutarate, chromium(II) citrate, chromium(II) phosphonate, chromium(II) sulfonate, chromium(II) carbonate, chromium (II) chloride, chromium(II) bromide, chromium(III) acetate, chromium(III) lactate, chromium(III) oxalate, chromium (III) maleate, chromium(III) succinate, chromium(III) glutarate, chromium(III) citrate, chromium(III) phosphonate, chromium(III) sulfonate, chromium(III) carbonate, chromium(III) chloride, chromium(III) bromide, aluminum acetate, aluminum lactate, aluminum oxalate, aluminum maleate, aluminum succinate, aluminum glutarate, aluminum citrate, aluminum phosphonate, aluminum sulfonate, aluminum carbonate, aluminum chloride, aluminum bromide, or a combination thereof; preferably, the crosslinking agent can be aluminum acetate, aluminum lactate, aluminum oxalate, aluminum maleate, aluminum succinate, aluminum glutarate, aluminum citrate, aluminum phosphonate, aluminum sulfonate, aluminum carbonate, aluminum chloride, aluminum bromide, or a combination thereof; more preferably, the crosslinking agent comprises aluminum citrate.

The methods can have the crosslinked water-soluble polymer be produced in the form of an emulsion, a dry powder, a dispersion, or a solution.

The uncrosslinked water-soluble polymer used in the methods can have a weight average molecular weight of greater than 1,000,000 Da.

The methods of increasing recovery of crude oil can have the weight average molecular weight of the uncrosslinked water-soluble polymer is from about 4,000,000 Da to about 20,000,000 Da or from about 10,000,000 Da to about 16,000,000 Da.

The methods described herein can have the aqueous flooding fluid comprising the crosslinked water-soluble polymer having a filter ratio of from 1 to about 1.5 at 900 ppm polymer concentration when the membrane filter size is less than 5.0 microns or when the membrane filter size is 1.2 microns.

The methods can have the aqueous flooding fluid comprise about 100 ppm to about 10000 ppm of the crosslinked water-soluble polymer.

The methods of increasing recovery of crude oil can have the aqueous flooding fluid further comprise a surfactant, a biocide, an antioxidant, or a combination thereof.

The methods described herein can further comprise displacing the hydrocarbon fluid in the formation into one or more production vessels.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
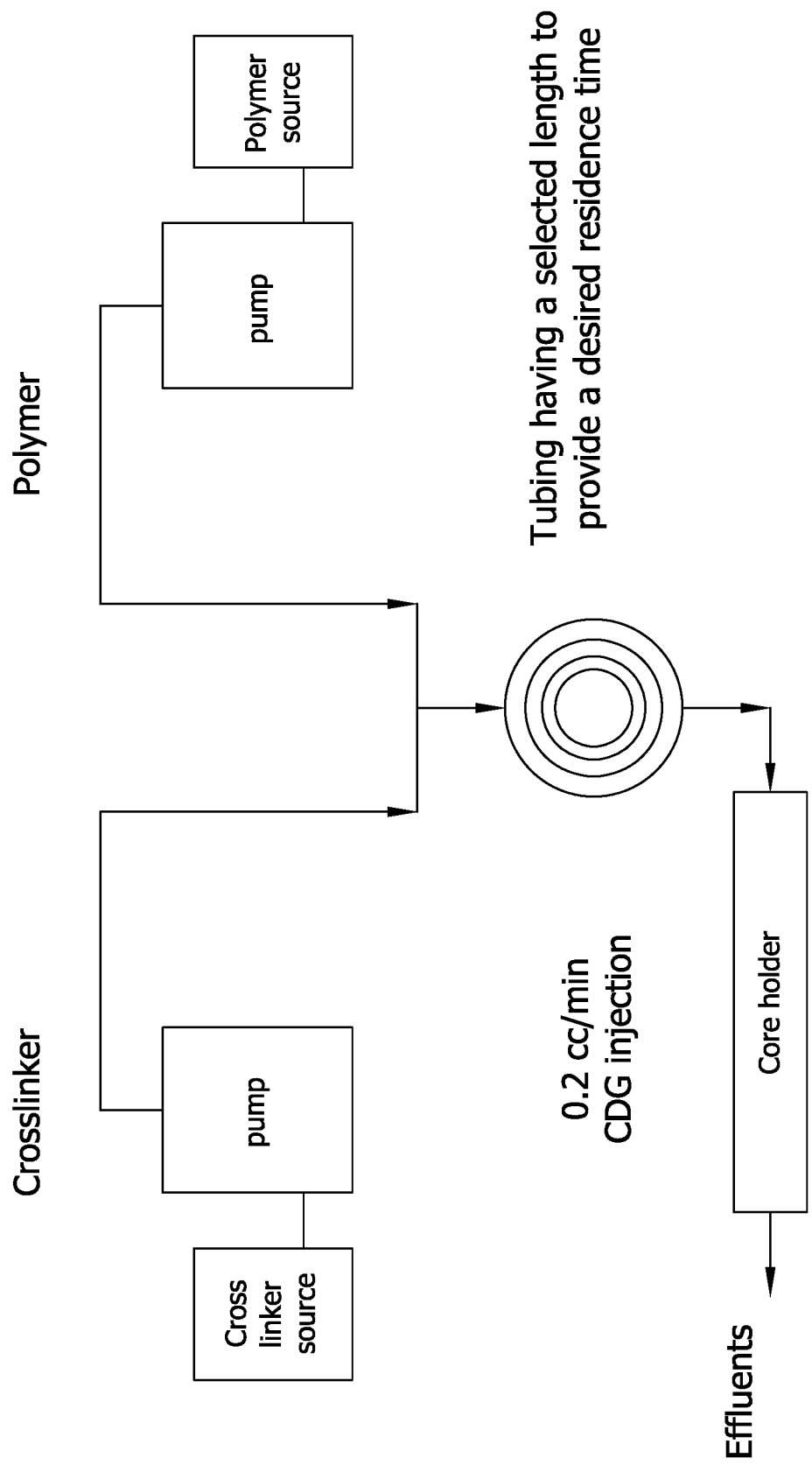
FIG. 1 is a schematic of the injection system wherein the crosslinking agent and the uncrosslinked polymer are pumped separately into a long tubing where reaction to form the crosslinked water-soluble polymer takes place.

The properties of an aqueous flooding fluid comprising these mobility control polymers can be improved by having an improved pressure differential and improved oil recovery as compared to an uncrosslinked polymer at a higher concentration. The mobility control polymers can be used in methods for increasing recovery of crude oil from a subterranean hydrocarbon containing formation. The mobility control polymers increase the apparent viscosity by increasing the hydrodynamic volume of the crosslinked water-soluble polymer as compared to the uncrosslinked water-soluble polymer.

The methods of increasing recovery of crude oil from a subterranean hydrocarbon containing formation comprise injecting an aqueous flooding fluid into a well that is in contact with the subterranean hydrocarbon-containing formation, the aqueous flooding fluid comprising injection water and a mobility control agent. The mobility control agent comprises a crosslinked water-soluble polymer wherein the crosslinked water-soluble polymer is derived from reacting a crosslinking agent with a polymer and the crosslinking agent comprises a polyvalent metal ion having a weight/weight ratio of polymer to crosslinking agent of at least 60:1.

For the methods described herein, the weight/weight ratio of polymer to crosslinking agent is from about 60:1 to about 200:1; from about 70:1 to about 200:1; from about 80:1 to about 200:1; from about 90:1 to about 200:1; from about 100:1 to about 200:1; from about 110:1 to about 200:1; from about 120:1 to about 200:1; from about 60:1 to about 160:1; from about 70:1 to about 160:1; from about 80:1 to about 160:1; from about 90:1 to about 160:1; from about 100:1 to about 160:1; from about 110:1 to about 160:1; from about 120:1 to about 160:1; from about 60:1 to about 140:1; from about 70:1 to about 140:1; from about 80:1 to about 140:1; from about 90:1 to about 140:1; from about 100:1 to about 140:1; from about 110:1 to about 140:1; from about 120:1 to about 140:1; from about 60:1 to about 120:1; from about 70:1 to about 120:1; from about 80:1 to about 120:1; from about 90:1 to about 120:1; from about 100:1 to about 120:1; or from about 110:1 to about 120:1.

Also, the methods of increasing recovery of crude oil can have the weight/weight ratio of polymer to crosslinking agent be from about 90:1 to about 200:1; from about 100:1 to about 200:1; from about 110:1 to about 200:1; from about 120:1 to about 200:1; from about 140:1 to about 200:1; from about 160:1 to about 200:1; from about 90:1 to about 180:1; from about 100:1 to about 180:1; from about 110:1 to about 180:1; from about 120:1 to about 180:1; from about 140:1 to about 180:1; from about 160:1 to about 180:1; from about 90:1 to about 160:1; from about 100:1 to about 160:1; from about 110:1 to about 160:1; from about 120:1 to about 160:1; from about 140:1 to about 160:1; from about 90:1 to about 120:1; or from about 100:1 to about 120:1 when the aqueous flooding fluid comprises at least 0.5 weight percent KCl.

The methods can have the pressure differential of the flooding fluid containing the crosslinked water-soluble polymer be not greater than the pressure differential of a flooding fluid containing an otherwise identical water-soluble polymer that is not crosslinked with a polyvalent metal ion.

Further, the methods can have the water-soluble polymer comprise a repeat unit derived from acrylic acid, an acrylic acid salt, a methacrylic acid salt, methacrylic acid, diacetone acrylamide, acrylamide, methacrylamide, a 2-acrylamido-2-methylpropane sulfonate, an acrylamido-t-butyl sulfonate, a styrene sulfonate, 2-(acryloyloxy)-N,N,N-trimethyl-ethanaminium, N,N-dimethylaminoethyl acrylate methyl chloride, N,N-dimethylaminoethyl methacrylate methyl chloride quaternary salt, N,N-dimethylaminopropyl acrylamide methyl chloride, N,N-dimethylaminopropyl methacrylamide methyl chloride, N-vinylformamide, N-vinylpyrrolidinone, diallyldimethyl ammonium chloride, carboxymethylcellulose, vinyl alcohol, or a combination thereof; preferably, the water-soluble polymer can comprise a repeat unit derived from acrylic acid, an acrylic acid salt, a methacrylic acid salt, methacrylic acid, acrylamide, a 2-acrylamido-2-methylpropane sulfonate, or a combination thereof; more preferably, the water-soluble polymer can comprise a repeat unit derived from acrylic acid, an acrylic acid salt, acrylamide, or a combination thereof.

The methods of increasing recovery of crude oil can have the water-soluble polymer comprise hydrolyzed polyacrylamide.

When the water-soluble polymer comprises hydrolyzed polyacrylamide, the hydrolyzed polyacrylamide can be from about 20 percent hydrolyzed to about 40 percent hydrolyzed; or from about 30 percent hydrolyzed to about 35 percent hydrolyzed.

The methods can have the polyvalent metal ion be a calcium ion, a zinc(II) ion, a chromium(II) ion, a chromium (III) ion, an aluminum ion, or a combination thereof.

Additionally, the methods described herein can have the crosslinking agent be calcium acetate, calcium lactate, calcium oxalate, calcium maleate, calcium succinate, calcium glutarate, calcium citrate, calcium phosphonate, calcium sulfonate, calcium carbonate, calcium chloride, calcium bromide, zinc(II) acetate, zinc(II) lactate, zinc(II) oxalate, zinc(II) maleate, zinc(II) succinate, zinc(II) glutarate, zinc (II) citrate, zinc(II) phosphonate, zinc(II) sulfonate, zinc(II) carbonate, zinc(II) chloride, zinc(II) bromide, chromium(II) acetate, chromium(II) lactate, chromium(II) oxalate, chromium(II) maleate, chromium(II) succinate, chromium(II) glutarate, chromium(II) citrate, chromium(II) phosphonate, chromium(II) sulfonate, chromium(II) carbonate, chromium (II) chloride, chromium(II) bromide, chromium(III) acetate, chromium(III) lactate, chromium(III) oxalate, chromium (III) maleate, chromium(III) succinate, chromium(III) glutarate, chromium(III) citrate, chromium(III) phosphonate, chromium(III) sulfonate, chromium(III) carbonate, chromium(III) chloride, chromium(III) bromide, aluminum acetate, aluminum lactate, aluminum oxalate, aluminum maleate, aluminum succinate, aluminum glutarate, aluminum citrate, aluminum phosphonate, aluminum sulfonate, aluminum carbonate, aluminum chloride, aluminum bromide, or a combination thereof; preferably, the crosslinking agent can be aluminum acetate, aluminum lactate, aluminum oxalate, aluminum maleate, aluminum succinate, aluminum glutarate, aluminum citrate, aluminum phosphonate, aluminum sulfonate, aluminum carbonate, aluminum chloride, aluminum bromide, or a combination thereof; more preferably, the crosslinking agent comprises aluminum citrate.

The methods can have the crosslinked water-soluble polymer be produced in the form of an emulsion, a dry powder, a dispersion, or a solution.

The uncrosslinked water-soluble polymer used in the methods can have a weight average molecular weight of greater than 1,000,000 Da.

The weight average molecular weight of the uncrosslinked water-soluble polymer can be from about 1,000,000 Da to about 20,000,000 Da, from about 1,000,000 Da to about 18,000,000 Da, from about 1,000,000 Da to about 16,000,000 Da, from about 1,000,000 Da to about 14,000,000 Da, from about 2,000,000 Da to about 20,000,000 Da, from about 2,000,000 Da to about 18,000,000 Da, from about 2,000,000 Da to about 16,000,000 Da, from about 2,000,000 Da to about 14,000,000 Da, from about 4,000,000 Da to about 20,000,000 Da, from about 4,000,000 Da to about 18,000,000 Da, from about 4,000,000 Da to about 16,000,000 Da, from about 4,000,000 Da to about 14,000,000 Da, from about 6,000,000 Da to about 20,000,000 Da, from about 6,000,000 Da to about 18,000,000 Da, from about 6,000,000 Da to about 16,000,000 Da, from about 6,000,000 Da to about 14,000,000 Da, from about 8,000,000 Da to about 20,000,000 Da, from about 8,000,000 Da to about 18,000,000 Da, from about 8,000,000 Da to about 16,000,000 Da, from about 8,000,000 Da to about 14,000,000 Da, from about 10,000,000 Da to about 20,000,000 Da, from about 10,000,000 Da to about 18,000,000 Da, from about 10,000,000 Da to about 16,000,000 Da, or from about 10,000,000 Da to about 14,000,000 Da.

The methods of increasing recovery of crude oil can have the weight average molecular weight of the uncrosslinked water-soluble polymer is from about 4,000,000 Da to about 20,000,000 Da or from about 10,000,000 Da to about 16,000,000 Da.

The methods described herein can have the aqueous flooding fluid comprising the crosslinked water-soluble polymer having a filter ratio of from 1 to about 1.5 at 900 ppm polymer concentration when the membrane filter size is less than 5.0 microns or when the membrane filter size is 1.2 microns.

The methods can have the aqueous flooding fluid comprise from about 100 ppm to about 10000 ppm; from about 200 ppm to about 10000 ppm; from about 400 ppm to about 10000 ppm; from about 600 ppm to about 10000 ppm; from about 800 ppm to about 10000 ppm; from about 100 ppm to about 5000 ppm; from about 200 ppm to about 5000 ppm; from about 400 ppm to about 5000 ppm; from about 600 ppm to about 5000 ppm; from about 800 ppm to about 5000 ppm; from about 100 ppm to about 2500 ppm; from about 200 ppm to about 2500 ppm; from about 400 ppm to about 2500 ppm; from about 600 ppm to about 2500 ppm; from about 800 ppm to about 2500 ppm; from about 100 ppm to about 1000 ppm; from about 200 ppm to about 1000 ppm; from about 400 ppm to about 1000 ppm; from about 600 ppm to about 1000 ppm; or from about 800 ppm to about 1000 ppm of the crosslinked water-soluble polymer.

The methods of increasing recovery of crude oil can have the aqueous flooding fluid further comprise a surfactant, a biocide, an antioxidant, or a combination thereof.

The methods described herein can further comprise displacing the hydrocarbon fluid in the formation into one or more production vessels.

The uncrosslinked water-soluble polymers can be substantially free of crosslinks or stated another way, the uncrosslinked water-soluble polymers have no crosslinks.

Aqueous flooding fluids comprising the water-soluble polymers described above remain water-soluble following introduction into a subterranean formation. In order for the aqueous flooding fluid to improve the mobility of the oil in the formation and improve the sweep efficiency of the aqueous polymer flood, the water-soluble polymer providing viscosity to the flooding fluid must be able to move unimpeded through the formation, without blocking the pores of the formation.

The desirable function of mobility control in enhanced oil recovery stands in contrast a different, polymer-aided Enhanced Oil Recovery (EOR) application called conformance control, in which polymers are injected in to the formation with the intent of forming crosslinked gels or insoluble polymers that block some of the pores in the formation. Such blocking of the pores improves the properties of the subterranean formation, instead of improving the properties of the aqueous flooding fluid.

Mobility control polymers, such as those described above, must therefore remain water soluble and not impede the flow of the aqueous flooding fluid in the formation. A recognized laboratory test to measure the ability of an aqueous flooding fluid to move through a subterranean formation without blocking the pores of the formation is called a filter ratio test. An example of this type of test is described in The American Petroleum Institute standards RP 63. In a filter ratio test, a standard volume of an aqueous flooding fluid containing a specific concentration of polymer is passed through a filter under a constant pressure. The time required for the solution to pass through the filter is recorded after specific volumes of solution have passed through the filter. The filter ratio is calculated as the ratio of the filter time for the final portion of solution, over the filter time for the initial, equal-sized portion of solution. Ideally, the aqueous flooding fluid should pass through the filter at a constant rate throughout the test, causing no pore-blocking during filtration, so that the filter ratio should be equal to one. The actual measured filter ratio is typically above one, however, so an upper limit to the filter ratio under a specific set of conditions is normally used in order to determine the suitability of an aqueous flooding fluid for use in a mobility control application.

The aqueous flooding fluid as injected into the well and after it is injected into the well can have a filter ratio of from 1 to about 1.2, or from 1 to about 1.1, and a flow rate of at least 0.1 mL/S when the membrane filter size is 1.2 microns and the pressure is 20 psi.

Prior to injection, the aqueous flooding fluid can have a viscosity of about 0 cPs to about 100 cPs, from about 0 cPs to about 80 cPs, from about 0 cPs to about 60 cPs, from about 0 cPs to about 40 cPs, from about 0 cPs to about 20 cPs, from about 0 cPs to about 10 cPs, from about 0 cPs to about 5 cPs, from about 0 cPs to about 4 cPs, from about 0 cPs to about 2 cPs, or from about 0 cPs to about 1 cPs.

After injection, the aqueous flooding fluid can have a viscosity of about 1 cPs to about 5000 cPs, from about 1 cPs to about 2000 cPs, from about 1 cPs to about 1000 cPs, from about 1 cPs to about 500 cPs, from about 1 cPs to about 400 cPs, from about 1 cPs to about 300 cPs, from about 1 cPs to about 200 cPs, from about 1 cPs to about 100 cPs, from about 1 cPs to about 50 cPs, from about 1 cPs to about 10 cPs, from about 1 cPs to about 5 cPs, from about 2 cPs to about 5000 cPs, from about 2 cPs to about 2000 cPs, from about 2 cPs to about 1000 cPs, from about 2 cPs to about 500 cPs, from about 2 cPs to about 400 cPs, from about 2 cPs to about 300 cPs, from about 2 cPs to about 200 cPs, from about 2 cPs to about 100 cPs, from about 2 cPs to about 50 cPs, from about 2 cPs to about 10 cPs, from about 2 cPs to about 5 cPs, from about 3 cPs to about 5000 cPs, from about 3 cPs to about 2000 cPs, from about 3 cPs to about 1000 cPs, from about 3 cPs to about 500 cPs, from about 3 cPs to about 400 cPs, from about 3 cPs to about 300 cPs, from about 3 cPs to about 200 cPs, from about 3 cPs to about 100 cPs, from about 3 cPs to about 50 cPs, from about 3 cPs to about 10 cPs, or from about 3 cPs to about 5 cPs.

The hydrocarbon oil can be a mineral oil, a biodiesel oil, an organic solvent, or the like.

The polymer and the crosslinking agent can be mixed before injection into the hydrocarbon-containing formation. For example, as shown in FIG. 1, an apparatus for injection of the crosslinked water-soluble polymer includes two pumps (e.g., Quzix pumps), one used to pump the crosslinking agent solution and the other to pump the polymer solution. These pumps pump the crosslinking agent and polymer solutions at the desired flow rate to provide the desired polymer to crosslinking agent ratio and are pumped into a long tube that can be altered in length and flow rate to provide a desired residence time for reaction of the polymer and crosslinking agent. For example, a length of tubing that can provide a residence time of about 45 to about 90 minutes, about 45 to about 80 minutes, about 45 to about 70 minutes, about 45 to about 60 minutes, about 50 to about 90 minutes, about 50 to about 80 minutes, about 50 to about 70 minutes, about 50 to about 60 minutes, about 55 to about 90 minutes, about 55 to about 80 minutes, about 55 to about 70 minutes, or about 55 to about 60 minutes can be used.

Water-Soluble Polymers

The methods described herein comprise injection of a mobility control agent comprising a cross-linked water-soluble polymer.

The water-soluble polymers can be synthesized by methods known in the art, such as, for example, radical polymerization.

Further, the polymer can be prepared in the form of a dry polymer, a dispersion polymer, a solution polymer, or as an inverse emulsion polymer.

The monomer solution can be suspended in a water-immiscible solvent such as a hydrocarbon oil, along with a high molecular weight, structured surfactant as described herein. Polymerization is then initiated via the addition of a small amount of a free radical initiator.

The free radical initiators generally decompose to generate free radicals by thermal, photochemical, redox, or hybrid mechanisms. An example of a thermal initiator includes, but is not limited to, azo compounds such as 2,2'-azobisisobutyronitrile. An example of a redox initiator includes, but is not limited to, t-butylhydroperoxide/ferrous ion and ammonium persulfate/sodium bisulfite.

The polymerization reaction is most often conducted between the temperatures of about 10° C. and about 110° C.

Once the polymerization reaction is completed, an optional step can be performed in order to reduce the residual monomer content of the product. This is accomplished, when desired, by means of heating the reaction product for an additional time period, or by the addition of additional initiators or other additives that will react with the residual monomer, or by a combination of both means. Additional processing steps can be optionally performed in order to, for example, adjust the product pH, or remove water or other solvents from the reaction product in order to produce a solid polymer product. The final polymer product form is thus dictated by the choice of the formula and the processing steps employed, so that a polymer product comprised of a liquid solution, a liquid emulsion, or a dry solid can be produced.

The polymerization can be initiated by addition of 2,2'-azobisisobutryonitrile and 2,2'-azobis(2,4-diemthylvaleronitrile) and purging of nitrogen at the reaction temperature of 30° C. to 60° C. After the polymerization reaction reaches greater than or equal to 85% conversion, the emulsion is post-heated at 57° C. or above for at least one hour to complete the polymerization and reduce monomer residuals. The hydrazide crosslinker could, alternatively, be added after the polymerization reaction.

The structure of the crosslinked polymer is confirmed by a combination of electrospray ionization mass spectrometry (ESI-MS) and nuclear magnetic resonance (NMR) spectroscopy.

The crosslinked water-soluble polymers can be prepared by mixing the uncrosslinked polymer and the crosslinking agent in a specific amount to form the crosslinked water-soluble polymer. The crosslinked water-soluble polymer can be Alternatively, the uncrosslinked polymer (e.g., hydrolyzed polyacrylamide) and the crosslinking agent (e.g., aluminum citrate) can be injected through separate tubes into a tube where the reagents can mix. The length and volume of the tubing can control the reaction time before the crosslinked water-soluble polymer is injected into the subterranean hydrocarbon-containing formation.

For example, FIG. 1 shows an apparatus capable of injecting large amounts of crosslinked water-soluble polymer. In this method, the uncrosslinked polymer (e.g., hydrolyzed polyacrylamide) and crosslinking agent (e.g., aluminum citrate) are injected by using two separate pumps. The uncrosslinked polymer and the crosslinking agent are mixed in a long-coiled tubing for about one hour before it enters the porous medium system. The length of the tubing is controlled by the flowrate and inner diameter (ID) of the tubing. This procedure simulates field applications in the laboratory and allows for the injection of large volumes of mobility control agents.

Methods for Recovering Hydrocarbon Fluid from Subterranean Formations

The methods for increasing recovery of a crude oil from a subterranean hydrocarbon-containing formation are disclosed herein. The method comprises injecting into the formation an aqueous flooding fluid as described herein.

In order to effectively displace the crude oil from the subterranean hydrocarbon-containing formation using the methods discussed above, the aqueous flooding fluid has a sufficiently high viscosity. When injected into a subterranean formation, a low viscosity flooding fluid can seek a path of least resistance in the reservoir rock, and can therefore bypass large quantities of oil. By increasing the viscosity to a value approaching that of the oil, the mobility of the aqueous flooding fluid is decreased and more effectively displaces the oil from the formation. The aqueous flooding fluid therefore comprises a crosslinked water-soluble polymer which, once in the subterranean formation (as will be described further below), has a large hydrodynamic volume that exerts a primary influence on the bulk viscosity of the solution. The high bulk viscosity of the flooding fluid aids the displacement of the oil from the formation, ultimately into one or more production vessels.

While a high bulk viscosity is desirable once the aqueous flooding fluid is in the subterranean hydrocarbon-containing formation, high viscosity solutions are difficult to inject into the formation at a sufficiently high rate. Thus, the injectivity of the aqueous flooding fluid is desirable as described above.

Furthermore, the water-soluble polymers can undergo significant shearing during the injection process, reducing the molecular weight and the hydrodynamic volume of the polymer, and the viscosity of the aqueous flooding fluid, which ultimately affects the displacement of oil. Thus, the aqueous flooding fluid comprises crosslinked water-soluble polymers. These properties allow for greater ease of injection down the wellbore, and also impart significant shear resistance to the polymer.

Aqueous Flooding Fluid

The aqueous flooding fluid used in the methods described herein comprises injection water and a mobility control agent. The mobility control agent comprises a crosslinked water-soluble polymer as described above.

The aqueous flooding fluid can have a viscosity of about 0 cPs to about 100 cPs before injection. After injecting the aqueous flooding fluid into the hydrocarbon-containing subterranean formation, the aqueous flooding fluid can have a viscosity of about 1 cPs to about 5000 cPs.

Prior to injection into a subterranean formation, an aqueous flooding fluid can have a viscosity of about 0 cPs to about 100 cPs. For example, the aqueous flooding fluid can have a viscosity of about 0 cPs, 0.001 cPs, 0.01 cPs, 0.1 cPs, 0.2 cPs, 0.3 cPs, 0.4 cPs, 0.5 cPs, 0.6 cPs, 0.7 cPs, 0.8 cPs, 0.9 cPs, 1 cPs, 2 cPs, 3 cPs, 4 cPs, 5 cPs, 6 cPs, 7 cPs, 8 cPs, 9 cPs, 10 cPs, 15 cPs, 20 cPs, 25 cPs, 30 cPs, 35 cPs, 40 cPs, 45 cPs, 50 cPs, 55 cPs, 60 cPs, 65 cPs, 70 cPs, 75 cPs, 80 cPs, 85 cPs, 90 cPs, 95 cPs or 100 cPs. Further, the aqueous flooding fluid can have a viscosity from about 0.001 cPs to about 100 cPs; from about 0.01 cPs to about 100 cPs; or from about 0.1 cPs to about 20 cPs. Preferably, the aqueous flooding fluid can have a viscosity from about 0.1 cPs to about 10 cPs.

Aqueous flooding fluids comprising the crosslinked water-soluble polymers described above remain water-soluble following introduction into a subterranean formation. In order for the aqueous flooding fluid to improve the mobility of the oil in the formation and improve the sweep efficiency of the aqueous polymer flood, the water-soluble polymer providing viscosity to the flooding fluid must be able to move unimpeded through the formation, without blocking the pores of the formation.

The aqueous flooding fluid comprises the water-soluble polymers described above and exhibit enhanced shear resistance. Polymers used for mobility control in enhanced oil recovery are typically high molecular weight, non-crosslinked polymers that are sensitive to the shear forces experienced by the polymer-containing aqueous flooding fluid as it is injected into the formation, and as it travels into the formation near the wellbore. Any choke points in this high flow-velocity region can cause a shear-induced, mechanical degradation of the molecular weight of the polymer, resulting in an undesirable reduction in the viscosity of the aqueous flooding fluid. High molecular weight, viscous polymer solutions of the type desirable for mobility control are especially sensitive to shear degradation. Even if engineering measures are taken to minimize the shear degradation of the injected aqueous flooding fluid, a viscosity loss of up to 25% of the initial polymer viscosity upon shearing is not uncommon, and a much greater viscosity loss, up to about 80% or more, is possible.

The shear-induced degradation of the fluid viscosity can be measured using an industry recognized test such as that described in The American Petroleum Institute standards RP 63, where the aqueous flooding fluid is passed through a small orifice under high pressure. The difference in the fluid viscosity before and after the choke point is measured to indicate the amount of shear degradation of the flooding fluid viscosity. Alternatively, a simple blender test can be used to induce the shear degradation of the aqueous flooding fluid. The amount of viscosity loss experienced at increasing shear times in the blender can be measured and used to determine the relative shear stability of flooding fluids comprised of different types of polymers.

The aqueous flooding fluids comprising the water-soluble polymers can display significant shear resistance. For example, when subjected to conditions of shear such as a blender test, the RP 63 standard test, or injection into a subterranean formation, the aqueous flooding fluids can undergo a viscosity loss of less than 50%, less than 49%, less than 48%, less than 47%, less than 46%, less than 45%, less than 44%, less than 43%, less than 42%, less than 41%, less than 40%, less than 39%, less than 38%, less than 37%, less than 36%, less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1%.

The composition can comprise an effective amount of the mobility control agent and a component selected from the group consisting of an organic solvent, a corrosion inhibitor, an asphaltene inhibitor, a paraffin inhibitor, a scale inhibitor, an emulsifier, a water clarifier, a dispersant, an emulsion breaker, a gas hydrate inhibitor, a biocide, a pH modifier, a surfactant, and a combination thereof.

The composition can comprise from about 20 to about 90 wt. % of a mobility control agent and from about 10 to about 80 wt. % of the component, preferably from about 50 to about 90 wt. % of one or more mobility control agents and from about 10 to about 50 wt. % of the component, and more preferably from about 65 to about 85 wt. % of one or more mobility control agents and from about 15 to about 35 wt. % of the component.

The component of the composition can comprise an organic solvent. The composition can comprise from about 1 to 80 wt. %, from about 5 to 50 wt. %, or from about 10 to 35 wt. % of the one or more organic solvents, based on total weight of the composition. The organic solvent can comprise an alcohol, a hydrocarbon, a ketone, an ether, an alkylene glycol, a glycol ether, an amide, a nitrile, a sulfoxide, an ester, or a combination thereof. Examples of suitable organic solvents include, but are not limited to, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or a combination thereof.

The component of the composition can comprise a corrosion inhibitor. The composition can comprise from about 0.1 to 20 wt. %, 0.1 to 10 wt. %, or 0.1 to 5 wt. % of the corrosion inhibitors, based on total weight of the composition. A composition of the invention can comprise from 0.1 to 10 percent by weight of the corrosion inhibitors, based on total weight of the composition. The composition can comprise 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, 10.5 wt %, 11.0 wt %, 11.5 wt %, 12.0 wt %, 12.5 wt %, 13.0 wt %, 13.5 wt %, 14.0 wt %, 14.5 wt %, or 15.0 wt % by weight of the corrosion inhibitors, based on total weight of the composition. Each system can have its own requirements, and the weight percent of one or more additional corrosion inhibitors in the composition can vary with the system in which it is used.

The corrosion inhibitor can comprise an imidazoline compound, a quaternary ammonium compound, a pyridinium compound, or a combination thereof.

The corrosion inhibitor component can comprise an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (I) or an imidazoline derivative. Representative imidazoline derivatives include an imidazolinium compound of Formula (II) or a bis-quaternized compound of Formula (III).

The corrosion inhibitor component can include an imidazoline of Formula (I):

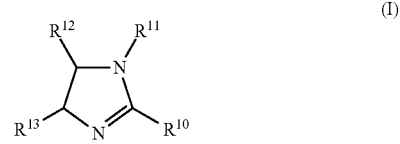

wherein $R^{10}$ is a $C_1$-$C_{20}$ alkyl or a $C_1$-$C_{20}$ alkoxyalkyl group; $R^{11}$ is hydrogen, $C_1$-$C_6$ alkyl, $C_1$-$C_6$ hydroxyalkyl, or $C_1$-$C_6$ arylalkyl; and $R^{12}$ and $R^{13}$ are independently hydrogen or a $C_1$-$C_6$ alkyl group. Preferably, the imidazoline includes an $R^{10}$ which is the alkyl mixture typical in tall oil fatty acid (TOFA), and $R^{11}$, $R^{12}$ and $R^{13}$ are each hydrogen.

The corrosion inhibitor component can include an imidazolinium compound of Formula (II):

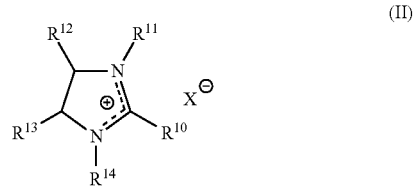

wherein $R^{10}$ is a $C_1$-$C_{20}$ alkyl or a $C_1$-$C_{20}$ alkoxyalkyl group; $R^{11}$ and $R^{14}$ are independently hydrogen, $C_1$-$C_6$ alkyl, $C_1$-$C_6$ hydroxyalkyl, or $C_1$-$C_6$ arylalkyl; $R^{12}$ and $R^{13}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The corrosion inhibitor can comprise a bis-quaternized compound having the formula (III):

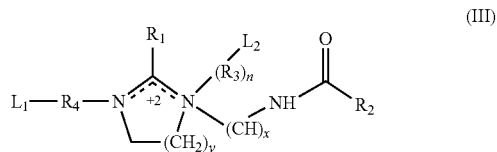

wherein $R_1$ and $R_2$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R_3$ and $R_4$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —SO$_3$H, —PO$_3$H$_2$, —COOR$_5$, —CONH$_2$, —CONHR$_5$, or —CON(R$_5$)$_2$; $R_5$ is each independently a branched or unbranched alkyl, aryl, alkylaryl, alkylheteroaryl, cycloalkyl, or heteroaryl group having from 1 to about 10 carbon atoms; n is 0 or 1, and when n is 0, $L_2$ is absent or H; x is from 1 to about 10; and y is from 1 to about 5. Preferably, $R_1$ and $R_2$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R_3$ and $R_4$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —C$_2$H$_2$—; $L_1$ is —COOH, —SO$_3$H, or —PO$_3$H$_2$; and $L_2$ is absent, H, —COOH, —SO$_3$H, or —PO$_3$H$_2$. For example, $R_1$ and $R_2$ can be derived from a mixture of tall oil fatty acids and are predominantly a mixture of $C_{17}H_{33}$ and $C_{17}H_{31}$ or can be $C_{16}$-$C_{18}$ alkyl; $R_3$ and $R_4$ can be $C_2$-$C_3$ alkylene such as —C$_2$H$_2$—; n is 1 and $L_2$ is —COOH or n is 0 and $L_2$ is absent or H; x is 2; y is 1; $R_3$ and $R_4$ are —C$_2$H$_2$—; and $L_1$ is —COOH.

It should be appreciated that the number of carbon atoms specified for each group of formula (III) refers to the main chain of carbon atoms and does not include carbon atoms that may be contributed by substituents.

The corrosion inhibitor can comprise a bis-quaternized imidazoline compound having the formula (III) wherein $R_1$ and $R_2$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R_4$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is-COOH, —SO$_3$H, or —PO$_3$H$_2$; and $L_2$ is absent or H. Preferably, a bis-quaternized compound has the formula (III) wherein $R_1$ and $R_2$ are each independently $C_{16}$-$C_{18}$ alkyl; $R_4$ is —C$_2$H$_2$—; x is 2; y is 1; n is 0; $L_1$ is —COOH, —SO$_3$H, or —PO$_3$H$_2$ and $L_2$ is absent or H.

The corrosion inhibitor can be a quaternary ammonium compound of Formula (IV):

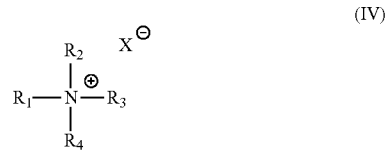

wherein $R_1$, $R_2$, and $R_3$ are independently $C_1$ to $C_{20}$ alkyl, $R_4$ is methyl or benzyl, and $X^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [N$^+$R$^{5a}$R$^{6a}$R$^{7a}$R$^{8a}$][X$^-$] wherein R$^{5a}$, R$^{6a}$, R$^{7a}$, and R$^{8a}$ contain one to 18 carbon atoms, and X is Cl, Br or I. For the quaternary salts, R$^{5a}$, R$^{6a}$, R$^{7a}$, and R$^{8a}$ can each be independently selected from the group consisting of alkyl (e.g., $C_1$-$C_8$ alkyl), hydroxyalkyl (e.g., $C_1$-$C_8$ hydroxyalkyl), and arylalkyl (e.g., benzyl). The mono or polycyclic aromatic amine salt with an alkyl or alkylaryl halide include salts of the formula [N$^+$R$^{5a}$R$^{6a}$R$^{7a}$R$^{8a}$][X$^-$] wherein R$^{5a}$, R$^{6a}$, R$^{7a}$, and R$^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The corrosion inhibitor component can comprise a pyridinium salt such as those represented by Formula (V):

wherein $R^9$ is an alkyl group, an aryl group, or an arylalkyl group, wherein said alkyl groups have from 1 to about 18 carbon atoms and X$^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The corrosion inhibitor components can include additional corrosion inhibitors such as phosphate esters, monomeric or oligomeric fatty acids, or alkoxylated amines.

The corrosion inhibitor component can comprise a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor component can include a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The corrosion inhibitor component can comprise an alkoxylated amine. The alkoxylated amine can be an ethoxylated alkyl amine. The alkoxylated amine can be ethoxylated tallow amine.

The component of the composition can comprise an organic sulfur compound, such as a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof. Preferably, the mercaptoalkyl alcohol comprises 2-mercaptoethanol. The organic sulfur compound can constitute 0.5 to 15 wt. % of the composition, based on total weight of the composition, preferably about 1 to about 10 wt. % and more preferably about 1 to about 5 wt. %. The organic sulfur compound can constitute 1, 2, 3, 4, 5, 6, 7, 8, 9, 10, 11, 12, 13, 14 or 15 wt. % of the composition.

The composition can be substantially free of or free of any organic sulfur compound other than the compound of formula (1). A composition is substantially free of any organic sulfur compound if it contains an amount of organic sulfur compound below the amount that will produce hydrogen sulfide gas upon storage at a temperature of 25° C. and ambient pressure.

The component of the composition can further include a demulsifier. Preferably, the demulsifier comprises an oxyalkylate polymer, such as a polyalkylene glycol. The demulsifier can constitute from about 0.1 to 10 wt. %, from about 0.5 to 5 wt. %, or from about 0.5 to 4 wt. % of the composition, based on total weight of the composition. The demulsifier can constitute 0.5, 1, 1.5, 2, 2.5, 3, 3.5, 4, 4.5 or 5 wt. % of the composition.

The component of the composition can include an asphaltene inhibitor. The composition can comprise from about 0.1 to 10 wt. %, from about 0.1 to 5 wt. %, or from about 0.5 to 4 wt. % of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The component of the composition can include an paraffin inhibitor. The composition can comprise from about 0.1 to 10 wt. %, from about 0.1 to 5 wt. %, or from about 0.5 to 4 wt. % of an paraffin inhibitor, based on total weight of the composition. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The component of the composition can include a scale inhibitor. The composition can comprise from about 0.1 to 20 wt. %, from about 0.5 to 10 wt. %, or from about 1 to 10 wt. % of a scale inhibitor, based on total weight of the composition. Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

The component of the composition can include an emulsifier. The composition can comprise from about 0.1 to 10 wt. %, from about 0.5 to 5 wt. %, or from about 0.5 to 4 wt. % of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkylsaccharide emulsifiers).

The component of the composition can include a water clarifier. The composition can comprise from about 0.1 to 10 wt. %, from about 0.5 to 5 wt. %, or from about 0.5 to 4 wt. % of a water clarifier, based on total weight of the composition. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

The component of the composition can include a dispersant. The composition can comprise from about 0.1 to 10 wt. %, from about 0.5 to 5 wt. %, or from about 0.5 to 4 wt. % of a dispersant, based on total weight of the composition. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The component of the composition can include an emulsion breaker. The composition can comprise from about 0.1 to 10 wt. %, from about 0.5 to 5 wt. %, or from about 0.5 to 4 wt. % of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, anionic, cationic and nonionic surfactants, and resins, such as phenolic and epoxide resins.

The component of the composition can include a hydrogen sulfide scavenger. The composition can comprise from about 1 to 50 wt. %, from about 1 to 40 wt. %, or from about 1 to 30 wt. % of a hydrogen sulfide scavenger, based on total weight of the composition. Suitable hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The component of the composition can include a gas hydrate inhibitor. The composition can comprise from about 0.1 to 25 wt. %, from about 0.1 to 20 wt. %, or from about 0.3 to 20 wt. % of a gas hydrate inhibitor, based on total weight of the composition. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The component of the composition can include a kinetic hydrate inhibitor. The composition can comprise from about 5 to 30 wt. %, from about 5 to 25 wt. %, or from about 10 to 25 wt. % of a kinetic hydrate inhibitor, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

The component of the composition can include a biocide. The composition can comprise from about 0.1 to 10 wt. %, from about 0.5 to 5 wt. %, or from about 0.5 to 4 wt. % of a biocide, based on total weight of the composition. Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

The component of the composition can include a pH modifier. The composition can comprise from about 0.1 to 20 wt. %, from about 0.5 to 10 wt. %, or from about 0.5 to 5 wt. % of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The component of the composition can include a surfactant. The composition can comprise from about 0.1 to 10 wt. %, from about 0.5 to 5 wt. %, or from about 0.5 to 4 wt. % of a surfactant, based on total weight of the composition. Suitable surfactants include, but are not limited to, anionic surfactants and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

Paraffin inhibitor compositions made according to the invention can further include additional functional agents or additives that provide a beneficial property. For example, additional agents or additives can be sequestrants, solubilizers, lubricants, buffers, cleaning agents, rinse aids, preservatives, binders, thickeners or other viscosity modifiers, processing aids, carriers, water-conditioning agents, foam inhibitors or foam generators, threshold agents or systems, aesthetic enhancing agents (i.e., dyes, odorants, perfumes), or other additives suitable for formulation with a corrosion inhibitor composition, and mixtures thereof. Additional agents or additives will vary according to the particular corrosion inhibitor composition being manufactured and its intend use as one skilled in the art will appreciate.

Alternatively, the compositions can not contain any of the additional agents or additives.

Additionally, the mobility control agent can be formulated into a treatment fluid comprising the following components. These formulations include the ranges of the components listed and can optionally include additional agents.

|  | Component | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Mobility control agent | 30-90 | 30-90 | 30-90 | 30-90 | 30-90 | 30-90 | 65-85 | 65-85 | 65-85 | 65-85 | 65-85 | 30-90 |
| Organic solvent | 10-35 |  |  |  |  |  | 10-35 |  |  |  |  | 10-35 |
| Corrosion inhibitor | 0.1-20 | 0.1-20 |  |  |  |  | 0.1-20 | 0.1-20 |  |  |  | 0.1-20 |
| Asphaltene inhibitor | 0.1-5 | 0.1-5 | 0.1-5 | 0.1-5 |  |  | 0.1-5 | 0.1-5 | 0.1-5 |  |  | 0.1-5 |
| Paraffin inhibitor |  |  |  |  |  |  |  |  |  |  |  |  |
| Scale inhibitor | 1-10 | 1-10 | 1-10 | 1-10 | 1-10 |  | 1-10 | 1-10 | 1-10 | 1-10 |  | 1-10 |
| Emulsifier |  |  |  |  |  |  |  |  |  |  |  |  |
| Water clarifier |  |  |  |  |  |  |  |  |  |  |  |  |
| Dispersant |  |  |  |  |  |  |  |  |  |  |  |  |
| Emulsion breaker |  |  |  |  |  |  |  |  |  |  |  |  |
| Gas hydrate inhibitor |  |  |  |  |  |  |  |  |  |  |  | 0.1-25 |
| Biocide | 0.5-5 | 0.5-5 | 0.5-5 | 0.5-5 | 0.5-5 | 0.5-5 | 0.5-5 | 0.5-5 | 0.5-5 | 0.5-5 | 0.5-5 |  |

|  | Component | | | | | | | | | | | |
|---|---|---|---|---|---|---|---|---|---|---|---|---|
|  | 13 | 14 | 15 | 16 | 17 | 18 | 19 | 20 | 21 | 22 | 23 | 24 |
| Mobility control agent | 30-90 | 30-90 | 30-90 | 30-90 | 30-90 | 30-90 | 65-85 | 65-85 | 65-85 | 65-85 | 65-85 | 65-85 |
| Organic solvent |  |  |  |  |  |  |  |  |  |  |  |  |
| Corrosion inhibitor | 0.1-20 | 0.1-20 | 0.1-20 | 0.1-20 | 0.1-20 | 0.1-20 | 0.1-20 | 0.1-20 | 0.1-20 | 0.1-20 | 0.1-20 | 0.1-20 |
| Asphaltene inhibitor | 0.1-5 |  |  |  |  |  | 0.1-5 |  |  |  |  |  |
| Paraffin inhibitor |  |  |  |  |  |  |  |  |  |  |  |  |
| Scale inhibitor | 1-10 | 1-10 |  |  | 1-10 |  | 1-10 | 1-10 |  |  |  | 1-10 |
| Emulsifier |  |  |  |  |  |  |  |  |  |  |  |  |
| Water clarifier |  |  |  |  |  |  |  |  |  |  |  |  |
| Dispersant |  |  |  |  |  |  |  |  |  |  |  |  |
| Emulsion breaker |  |  |  |  |  |  |  |  |  |  |  |  |
| Gas hydrate inhibitor | 0.1-25 | 0.1-25 | 0.1-25 |  |  |  | 0.1-25 | 0.1-25 | 0.1-25 |  | 0.1-25 |  |
| Biocide |  |  |  |  |  | 0.5-5 | 0.5-5 | 0.5-5 | 0.5-5 | 0.5-5 |  |  |

Compositions can further include additional functional agents or additives that provide a beneficial property. Additional agents or additives will vary according to the aqueous flooding fluid being manufactured and its intend use as one skilled in the art will appreciate.

Having described the invention in detail, it will be apparent that modifications and variations are possible without departing from the scope of the invention defined in the appended claims.

EXAMPLES

The following non-limiting examples are provided to further illustrate the methods described herein. All reagents were purchased from commercial sources and used as received unless stated otherwise. The uncrosslinked polymer was a hydrolyzed polyacrylamide having about 32% of amide groups hydrolyzed and available commercially from Nalco as EOR970. The crosslinking agent was aluminum citrate.

Example 1: Screen Factor Experiments

Figure 2:
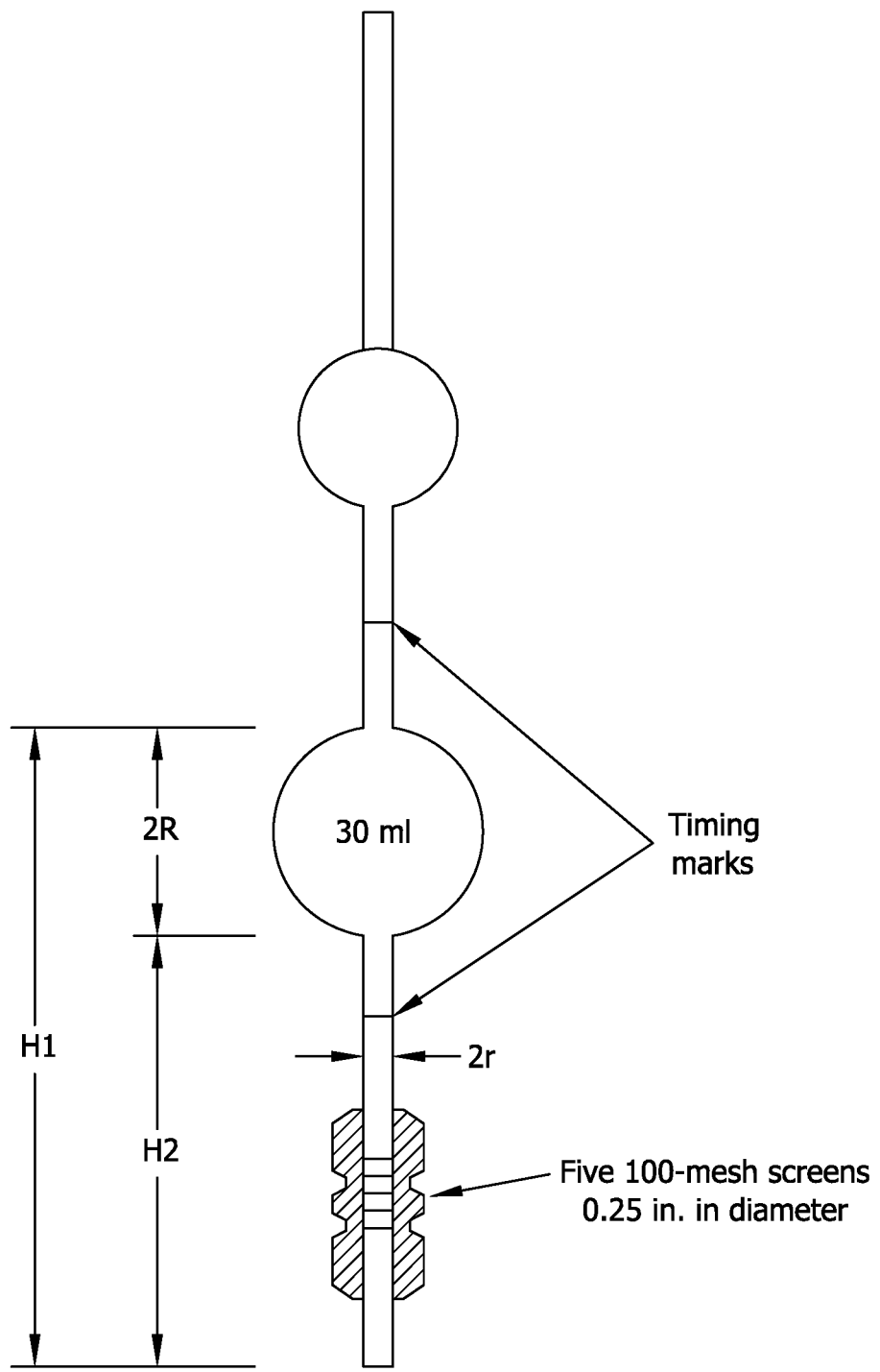
FIG. 2 is a schematic of the apparatus used in the screen factor test described in Example 1.
Figure 3:
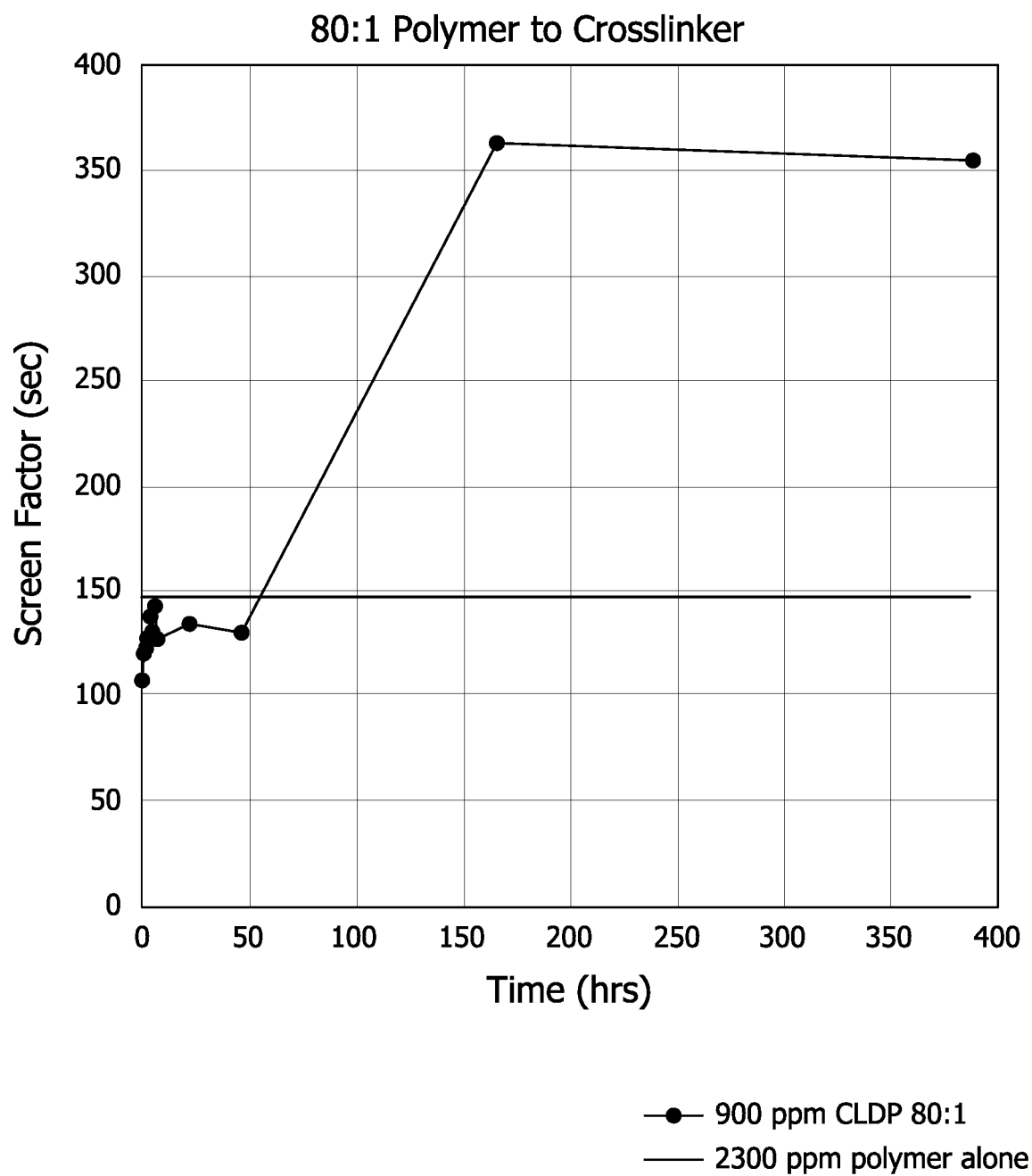
FIG. 3 is a graph of the screen factor in seconds versus the time in hours that the aluminum citrate and hydrolyzed polyvinylamide have been mixed.

The screen factor test uses the apparatus of FIG. 2. The apparatus includes five screens having 100 mesh stacked on top of each other. The solution containing the sample (either 2300 ppm of uncrosslinked hydrolyzed polyvinylamide polymer or 900 ppm of hydrolyzed polyvinylamide crosslinked with aluminum citrate having a polymer to crosslinking agent weight/weight ratio of 80:1 (CLDP)) was placed in the top bulb of the apparatus. The solution was at approximately room temperature (i.e., 22-25° C.). Any air trapped in the screens was removed and the solution was then allowed to run freely. Timing was begun when the meniscus of the solution passed the first timing mark above the second bulb and ended when the meniscus passed the second timing mark below the second bulb. The results of this experiment are shown in FIG. 3 where the screen factor in seconds is plotted against the time after mixing of the aluminum citrate with the hydrolyzed polyvinylamide. These results indicate that the crosslinked polymer provides a higher viscosity at 900 ppm than the uncrosslinked polymer at a higher concentration of 2300 ppm.

Example 2: Coreflood Experiments

Three porous medium experiments, also referred to as coreflood (CF) can be conducted using the approach explained for FIG. 1 to prove the concept. The apparatus shown in FIG. 1 includes two pumps (e.g., Quzix pumps), one used to pump the crosslinking agent solution and the other to pump the polymer solution. These pumps pump the crosslinking agent and polymer solutions at the desired flow rate to provide the desired polymer to crosslinking agent ratio and are pumped into a long tube that can be altered to provide a desired residence time for reaction of the polymer and crosslinking agent.

It is expected that a coreflood experiment could be conducted using an uncrosslinked polymer at higher application dosage (e.g., approximately 2318 ppm) that would establish a baseline of oil recovery and pressure profile. This coreflood experiment is performed on a 12" long and 1.5" diameter sandpack.

Another coreflood experiment using the hydrolyzed polyacrylamide described above and an aluminum citrate crosslinking agent at a polymer to crosslinking agent weight/weight ratio of 60:1 for one pore volume (PV) and 80:1 for four PV could be compared to the coreflood experiment using the uncrosslinked polymer. This experiment is performed on a 12" long and 1.5" diameter sandpack and the results are expected to show that the crosslinked polymers at 60:1 and 80:1 polymer:crosslinker ratios provide a higher oil recovery as compared to the same concentration of the same polymer that is uncrosslined.

A third coreflood experiment can be performed and is expected to show that the hydrolyzed polyvinylamide crosslinked with aluminum citrate having a polymer to crosslinking agent weight/weight ratio of 80:1 can be injected in large quantities and/or volumes in the lab without exhibiting problems with injecting the crosslinked polymer solution. The injection flow rate of the polymer is 0.23 mL/minute and the injection flow rate for the crosslinking agent is 0.012 mL/minute. Once the polymer and crosslinking agent are mixed, the agents are diluted. For example, the polymer is diluted by a factor of 1.05 and the crosslinking agent is diluted by a factor of 20. For example, when the crosslinking agent solution has a concentration of 225 ppm, the crosslinking agent concentration is 11.25 ppm in the mixture and when the polymer solution is 900 ppm, the polymer concentration is 855 ppm in the mixture. A 6' long tubing can be packed with sand and used for this test. This test is also performed in presence of oil.

The process used for the coreflood experiments described herein is as follows. Sand packs are measured for their porosity and permeability by brine. Oil is injected into the sand packs to establish the initial oil and water saturations. After aging dynamically for about 2 weeks, water is injected to obtain waterflood oil recovery. The oil is collected incrementally in centrifuge tubes. The collection is performed until a stable pressure is achieved, and no more oil is collected in the effluent. To eliminate end effect at the end of waterflood, flow rate of waterflood is increased by 10 times for a period of time and then decreased back to the baseline flow rate. Any additional oil recovery at this stage is counted toward waterflood oil recovery. At the end of waterflood, chemicals (polymer alone in or CLDP) are injected. Recovered oil is recorded at the effluents and counted for the incremental oil recovery as % OOIP. Total chemical injection is about 5 pore volume. At the end of chemical injection, brine is injected to compare and evaluate the post-chemical pressure profiles.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

What is claimed is:

1. A method for increasing recovery of crude oil from a subterranean hydrocarbon-containing formation, the method comprising injecting an aqueous flooding fluid into a well that is in contact with the subterranean hydrocarbon-containing formation, the aqueous flooding fluid comprising injection water and a mobility control agent, the mobility control agent comprising a crosslinked water-soluble polymer,
wherein the crosslinked water-soluble polymer is derived from reacting a crosslinking agent with a polymer and the crosslinking agent comprises a polyvalent metal ion having a weight/weight ratio of polymer to crosslinking agent of at least 60:1; and
wherein the aqueous flooding fluid improves the mobility of the oil in the formation without blocking the pores of the formation.

2. The method of claim 1, wherein the weight/weight ratio of polymer to crosslinking agent is from about 70:1 to about 120:1.

3. The method of claim 1, wherein the weight/weight ratio of polymer to crosslinking agent is from about 90:1 to about 200:1 when the aqueous flooding fluid comprises at least 0.5 weight percent KCl.

4. The method of claim 1, wherein the pressure differential of the flooding fluid containing the crosslinked water-soluble polymer is not greater than the pressure differential of a flooding fluid containing an otherwise identical water-soluble polymer that is not crosslinked with a polyvalent metal ion.

5. The method of claim 1, wherein the water-soluble polymer comprises a repeat unit derived from acrylic acid, an acrylic acid salt, a methacrylic acid salt, methacrylic acid, diacetone acrylamide, acrylamide, methacrylamide, a 2-acrylamido-2-methylpropane sulfonate, an acrylamido-t-butyl sulfonate, a styrene sulfonate, 2-(acryloyloxy)-N,N,N-trimethylethanaminium, N,N-dimethylaminoethyl acrylate methyl chloride, N,N-dimethylaminoethyl methacrylate methyl chloride quaternary salt, N,N-dimethylaminopropyl acrylamide methyl chloride, N,N-dimethylaminopropyl methacrylamide methyl chloride, N-vinylformamide, N-vinylpyrrolidinone, diallyldimethyl ammonium chloride, carboxymethylcellulose, vinyl alcohol, or a combination thereof.

6. The method of claim 5, wherein the water-soluble polymer comprises a repeat unit derived from acrylic acid, an acrylic acid salt, a methacrylic acid salt, methacrylic acid, acrylamide, a 2-acrylamido-2-methylpropane sulfonate, or a combination thereof.

7. The method of claim 6, wherein the water-soluble polymer comprises a repeat unit derived from acrylic acid, an acrylic acid salt, acrylamide, or a combination thereof.

8. The method of claim 7, wherein the water-soluble polymer comprises hydrolyzed polyacrylamide.

9. The method of claim 8, wherein the hydrolyzed polyacrylamide is from about 20 percent hydrolyzed to about 40 percent hydrolyzed.

10. The method of claim 1, wherein the polyvalent metal ion is a calcium ion, a zinc(II) ion, a chromium(II) ion, a chromium(III) ion, an aluminum ion, or a combination thereof.

11. The method of claim 10, wherein the crosslinking agent is aluminum acetate, aluminum lactate, aluminum oxalate, aluminum maleate, aluminum succinate, aluminum glutarate, aluminum citrate, aluminum phosphonate, aluminum sulfonate, aluminum carbonate, aluminum chloride, aluminum bromide, or a combination thereof.

12. The method of claim 10, wherein the crosslinking agent comprises aluminum citrate.

13. The method of claim 1, wherein the crosslinked water-soluble polymer is produced in the form of an emulsion, a dry powder, a dispersion, or a solution.

14. The method of claim 1, wherein the weight average molecular weight of the uncrosslinked water-soluble polymer is greater than 1,000,000 Da.

15. The method of claim 13, wherein the weight average molecular weight of the uncrosslinked water-soluble polymer is from about 10,000,000 Da to about 16,000,000 Da.

16. The method of claim 1, wherein the aqueous flooding fluid comprising the crosslinked water-soluble polymer has a filter ratio of from 1 to about 1.5 at 900 ppm polymer concentration when the membrane filter size is less than 5.0 microns.

17. The method of claim 16, wherein the membrane filter size is 1.2 microns.

18. The method of claim 15, wherein the aqueous flooding fluid comprises about 100 ppm to about 10000 ppm of the crosslinked water-soluble polymer.

19. The method of claim 1, wherein the aqueous flooding fluid further comprises a surfactant, a biocide, an antioxidant, or a combination thereof.

20. The method of claim 1, further comprising displacing the hydrocarbon fluid in the formation into one or more production vessels.

* * * * *